ns. More particularly, the
2,991,268
CURABLE COMPOSITION OF POLYETHYLENE, DI-α-CUMYL PEROXIDE, CARBON BLACK, COAL DUST AND CURED PRODUCT THEREOF
Martin J. Langan, Bridgeport, Conn., assignor to General Electric Company, a corporation of New York
No Drawing. Filed Feb. 20, 1959, Ser. No. 794,521
7 Claims. (Cl. 260—41)

This invention relates to compositions comprising polyethylene, an agent for chemically cross-linking polyethylene, and carbonaceous materials. More particularly, the invention relates to curable compositions comprising polyethylene, cross-linking agent, and mixtures of carbonaceous materials comminuted in part by mechanical processes and in part by other processes; and the cured products thereof.

Filler-containing chemically cross-linked polyethylene is described and claimed in Gilbert and Precopio application Serial No. 509,387, filed May 18, 1955, and assigned to the same assignee as the present application. Among filler materials, the Gilbert and Precopio application includes carbon blacks (colloidal carbon) such as animal or vegetable, channel, furnace, and thermal carbon black, etc. The carbon blacks thus described are microparticles which have been obtained by some form of precipitation process as opposed to the much coarser heterogeneous particles obtainable by mechanical crushing or grinding. The precipitated particles sell at prices of the order of 8¢ per pound as opposed to a price of the order of 1¢ per pound for the mechanically crushed particles. However, minute size is of such importance in producing desirable properties in the final product that commercial interest is principally directed toward the high-priced precipitated particles.

Commercial carbon blacks are prepared by incomplete combustion of hydrocarbon gases or liquids. The carbon particles precipitated by incomplete combustion are characterized by a spherical or near-spherical configuration and a relatively narrow range of particle sizes for any particular set of precipitating conditions. However, the conditions of precipitation can be controlled to produce particle sizes of a narrow range within a broad range of 14 to 450 millimicrons (a millimicron is one thousandth of a millimeter). The larger diameter particles are less expensive than the ultra fine particles but do not always produce as satisfactory a final filled product. As a filler for polyethylene, a relatively large particle precipitated carbon referred to in the trade as MT (medium thermal) has proved satisfactory.

While a conventional purpose for adding fillers to various plastic and elastomeric materials is to reduce the cost, it was discovered many years ago that certain filler materials not only reduced cost but also imparted improved properties. This was particularly true of the precipitated carbon blacks used in rubber and such filler materials have been designated "reinforcing" fillers. In addition to lowering cost and improving properties, filler materials help to control the consistency of mixtures in which they are incorporated and also improve the form stability of extrusion mixtures.

One of the objects of the present invention is to provide a carbon-filled polyethylene composition in which the carbon fillers are a minimum cost factor.

Another object of the present invention is to provide a low-cost carbon-filled polyethylene suitable for extrusion and molding.

A further object of the invention is to provide a carbon-filled curable polyethylene composition containing a minimum quantity of cross-linking agent.

Other objects of the invention will become apparent from the following specification. Briefly stated, in accordance with one of its aspects, the invention is directed to a curable composition comprising 15% to 30% by weight of polyethylene, 30% to 50% by weight of carbon black, 0.3% to 3% by weight of di-α-cumyl peroxide (3% to 10% by weight of the polyethylene present), and the balance consisting of coal dust.

Coal dust is a commodity readily available commercially at a cost of the order of 1¢ per pound. As used in this invention as a co-filler with precipitated carbon (referred to as carbon black), coal dust serves as a substitute for a large proportion of the carbon black and enhances some of the properties of the polyethylene composition. The coal dust should preferably be milled to the finest particle size within the practical limits achievable from mechanical milling or grinding.

It is desirable that the major portion of the coal dust be capable of passing through a 325-mesh screen. A typical mesh analysis follows:

| Screen size: | Percent retained by weight |
|---|---|
| 60-mesh | .024 |
| 80-mesh | .098 |
| 100-mesh | .309 |
| 200-mesh | 9.445 |
| 325-mesh | 24.516 |
| | 34.392 |

The remaining 65.608% passed through a 325-mesh screen. Coal dust from anthracite coal is preferred and it is desirable that the dust have a low moisture content. A typical anthracite dust had an ash content of 10.75 percent by weight and a moisture content 1.230 percent by weight.

Dust from soft coal may be used provided it has been processed to remove the more volatile constituents.

The polyethylene of this invention is a polymeric material formed by the polymerization of ethylene and includes polyethylene made by the conventional high-pressure process as well as the more recent high-density linear polyethylene made by catalytic processes. The preferred cross-linking agent is di-α-cumyl peroxide although other tertiary peroxides are of some use as cross-linking agents.

It has been previously mentioned that a preferred carbon black is the so-called MT or medium thermal black, the particle size of which lies within the range 320–472 millimicrons. Among other carbon blacks which are satisfactory alone or in combination are FT (fine thermal), HMF (high modulus furnace), GPF (general purpose furnace), HAF (high abrasive furnace), SRF (semi-reinforcing furnace), EPC (easy processing channel), HPC (hard processing channel), etc. The following examples are directed to compositions which are satisfactory for extrusion or molding. All parts are by weight.

*Example 1.*—Polyethylene (15 parts), carbon black MT (30 parts), and anthracite coal dust (52 parts) were milled until a homogeneous mixture was obtained after which di-α-cumyl peroxide (0.5 part) was milled into the sheet. This product was pressed into a 78 mil sheet by heating in a press for 20 minutes at 330° F. under a pressure of 500 p.s.i. A 1" x 1¾" piece of the cured material tested in a Tour-Marshal tester manufactured by the Tinius Olsen Testing Machine Company gave an angular deflection of 25° under a bending moment of 4⅓ pounds. An extrusion of this material was characterized by excellent stiffness and impact resistance.

The Tour-Marshal tester is a device which clamps one end of a test sample and applies a bending force to a free end protruding outward about ¾". The bending force is applied until a failure occurs at which time the force applied and the angular deflection of the test piece provide an indication of the strength thereof. An article describing the Tour-Marshal appears in the Proceedings of the American Society for Testing Materials, vol. 37, part II, page 146 (1937).

*Example 2.*—Polyethylene (30 parts), carbon black FT (fine thermal) (50 parts), and anthracite coal dust (15 parts), were milled to homogeneity in the manner of Example 1 and di-α-cumyl peroxide (1.5 parts) was added as set forth in the example. A cured sheet of this material gave an angular deflection of 55° under a bending moment of 4.44 pounds.

*Example 3.*—Polyethylene (22 parts), carbon black MT (32 parts), and anthracite coal dust (43 parts) were milled as in the case of Examples 1 and 2 and di-α-cumyl peroxide (0.7 part) was added and a sample cured as in the case of the preceding examples. A test sample of this composition in the Tour-Marshal tester gave an angular deflection of 40° under a bending moment of 4.9 pounds at the time of failure. An extrusion of this composition proved to be very strong as well as highly impact-resistant. Accordingly, this is a preferred composition.

An unexpected cost advantage accruing to the use of coal dust, in accordance with this invention, is a saving in the quantity of di-α-cumyl peroxide necessary to achieve a particular degree of cure. While the reason for this saving is not known, it is believed that some of the volatile constituents of the coal dust serve as crosslinking agents and thus enable the same degree of cure to be achieved with less di-α-cumyl peroxide. This is important since di-α-cumyl peroxide is the costliest constituent present, followed in order by polyethylene, carbon black, and coal dust. Thus, cost considerations dictate that the composition be loaded as heavily as possible first with coal dust and then with carbon black. While the range of di-α-cumyl peroxide is recited as 2% to 10% by weight of the polyethylene present, 3% is an optimum quantity for a high coal dust loading. Where the coal dust loading is low, the optimum amount of di-α-cumyl peroxide is 4% to 5% by weight of the polyethylene. Normally, there is no advantage to be gained from the use of higher proportions of di-α-cumyl peroxide.

While the invention has been explained with reference to certain specific embodiments thereof, it is obvious that a number of variations falling within the true spirit of the invention are possible. Accordingly, it is intended that the invention be limited in scope only as may be necessitated by the scope of the appended claims.

What I claim as new and desire to secure by Letters Patent of the United States is:

1. A curable composition comprising 15% to 30% by weight of polyethylene, 30% to 50% by weight of carbon black, 0.3% to 3% by weight of di-α-cumyl peroxide, and the balance to a total weight percentage of 100% consisting of coal dust.

2. The cured product of claim 1.

3. A curable composition comprising 15% to 30% by weight of polyethylene, 30% to 50% by weight of MT carbon black, 0.3% to 3% by weight of di-α-cumyl peroxide, and the balance to a total weight percentage of 100% consisting of anthracite coal dust.

4. The cured product of claim 3.

5. A curable composition as claimed in claim 3 wherein over half of the coal dust will pass through a 325-mesh screen.

6. A curable composition comprising about 22% by weight of polyethylene, about 32% by weight of carbon black, about 0.66% by weight of di-α-cumyl peroxide, and the balance to a total weight percentage of 100% made up substantially of coal dust.

7. The cured product of claim 6.

References Cited in the file of this patent

UNITED STATES PATENTS

| | | |
|---|---|---|
| 2,445,312 | Cooke et al. | July 20, 1948 |
| 2,888,424 | Precopio et al. | May 26, 1959 |